Oct. 6, 1964    H. G. THRASHER    3,151,833
IRROTATIONAL MOUNT

Filed Sept. 28, 1960    2 Sheets—Sheet 1

INVENTOR:
Howard G. Thrasher

Richard K. Ehrlich
Attorney

Oct. 6, 1964

H. G. THRASHER 3,151,833

IRROTATIONAL MOUNT

Filed Sept. 28, 1960

INVENTOR:
Howard G. Thrasher

By Richard K. Ehrlich
Attorney

United States Patent Office 3,151,833
Patented Oct. 6, 1964

1

3,151,833
IRROTATIONAL MOUNT
Howard G. Thrasher, Los Angeles, Calif., assignor to Litton Systems, Inc., Beverly Hills, Calif.
Filed Sept. 28, 1960, Ser. No. 59,028
6 Claims. (Cl. 248—358)

This invention relates to an irrotational isolation mount and more particularly to an irrotational isolation mount utilizing a support member including three mutually orthogonal bellows-like legs.

In many systems and devices in current use, it is necessary to isolate a platform from vibrations as well as to insure that the platform maintains a constant angular orientation with respect to a predetermined reference plane. For example, the inertial platform of an inertial navigation system must be mounted within the vehicle whose position is to be determined in such a manner that vibrations of the vehicle are not transmitted to the inertial platform and also in such a manner that the inertial platform experiences no rotational movement with respect to the vehicle, or, in other words, the angular orientation of the platform with respect to the vehicle must be continually maintained. The importance of the isolating requirements of an inertial platform becomes clear when it is realized that the gyroscopes and the accelerometers mounted on the platform rectify high frequency vibration applied thereto so that a spurious output signal is generated by these components in response to such vibratory displacement. Hence, the overall accuracy of the navigational system utilizing the inertial platform is effected thereby. Furthermore, it is clear that unless the angular orientation of the platform is maintained, inaccurate accelerations will be sensed, thereby also severely limiting the accuracy of the system.

As would be expected, many different types of mounting devices have been developed in the art to overcome the foregoing described accuracy limitations. However, with two exceptions, the known prior art devices are incapable of isolating the platform affixed to the mount while also preserving the angular orientation of the platform with respect to the vehicle to which it is mounted.

One of these exceptions is an irrotational mount disclosed in copending United States patent application, Serial No. 823,163, for "Precision Irrotational Mount," filed on June 26, 1959, by Howard G. Thrasher, now Patent No. 2,971,383, and the other exception is an irrotational mount disclosed in copending United States patent application, Serial No. 846,003, entitled "Irrotational Mount," filed October 12, 1959, by Howard G. Thrasher, now Patent No. 3,057,592. Briefly, the mount disclosed in the first mentioned patent application interconnects a platform carriage to a base plate by means of a pivotably jointed parallelogram, pivotably coupled to the base plate and platform and by a pair of quadrilateral flexure plates having parallel opposite sides, a predetermined side of each of the flexure plates being oriented substantially perpendicular to the plane of the pivotably jointed parallelogram and affixed to the base plate, the side of each flexure plate opposite the predetermined side being pivotably coupled to the platform carriage in such an orientation that the flexure plates are mutually orthogonal.

While this type of isolation mount operates well and is quite rugged in construction, it is relatively heavy and bulky so that in a limited number of applications where size and weight are critical, the mount is not suitable for use. The irrotational mount described in the second copending application is considerably more compact compared to the foregoing described mount and is suitable for use in most applications where size and weight are critical. However, in a limited number of applications

2 where size and weight are of the utmost importance, the size and weight of even this platform mount are such as to make the mount unsuitable for use therein.

The present invention, in contrast to the prior art mounts mentioned above is extremely small in size and light in weight and yet is capable of isolating a platform mounted thereon from vibratory displacement while preventing the platform from experiencing variations in its angular orientations with respect to the base upon which the platform is mounted. According to the basic concept of the present invention, a flexible bellows-like unit is utilized in the mount of the invention to interconnect a platform with a frame or base, the compressibility of the bellows-like unit along its axis and the flexibility of the bellows-like unit in a direction perpendicular to its axis providing the isolation characteristics of the mount while the capability of the bellows-like unit to resist rotation of one of its ends with respect to its other end about its axis providing the resistance of the mount to platform rotation relative to the base.

In one embodiment of the invention, the irrotational mount includes a plurality of four supported members positioned symmetrically about a generally rectangular platform for coupling the platform to a base, each support member including a plurality of three mutually orthogonal bellows-like cylindrical units. More particularly, one of the ends of each of the three bellows-like units of each member is affixed to the platform while the other ends of each of the units are affixed to the base plate whereby the vibratory movement of the base plate is taken up by the cylindrical bellows-like units and not transmitted to the platform support, a damping finger within each bellows-like unit damping the movement of the bellows-like units. Furthermore, the ability of the bellows-like units to resist rotation about their axes is sufficient to maintain a predetermined platform angular orientation relative to the base.

It is therefore an object of the present invention to provide a compact light-weight precision irrotational mount utilizing a bellows-like unit.

It is another object of the present invention to provide an irrotational mount including three mutually orthogonal bellows-like units.

It is a further object of the present invention to provide an irrotational mount which is compact in design and has a bellows-like unit responsive to vibratory displacement to expand and contract along its axis and flex in a direction orthogonal to its axis to isolate a platform mounted thereon and which resists rotation of one end of the bellows-like unit with respect to the other end about its axis thereby preventing rotation of the platform.

It is a further object of the present invention to provide an irrotational mount including a plurality of four support members, each support member including three mutually orthogonal bellows-like units.

It is another object of the present invention to provide an irrotational mount utilizing a cylindrical bellows-like unit.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Figure 1:
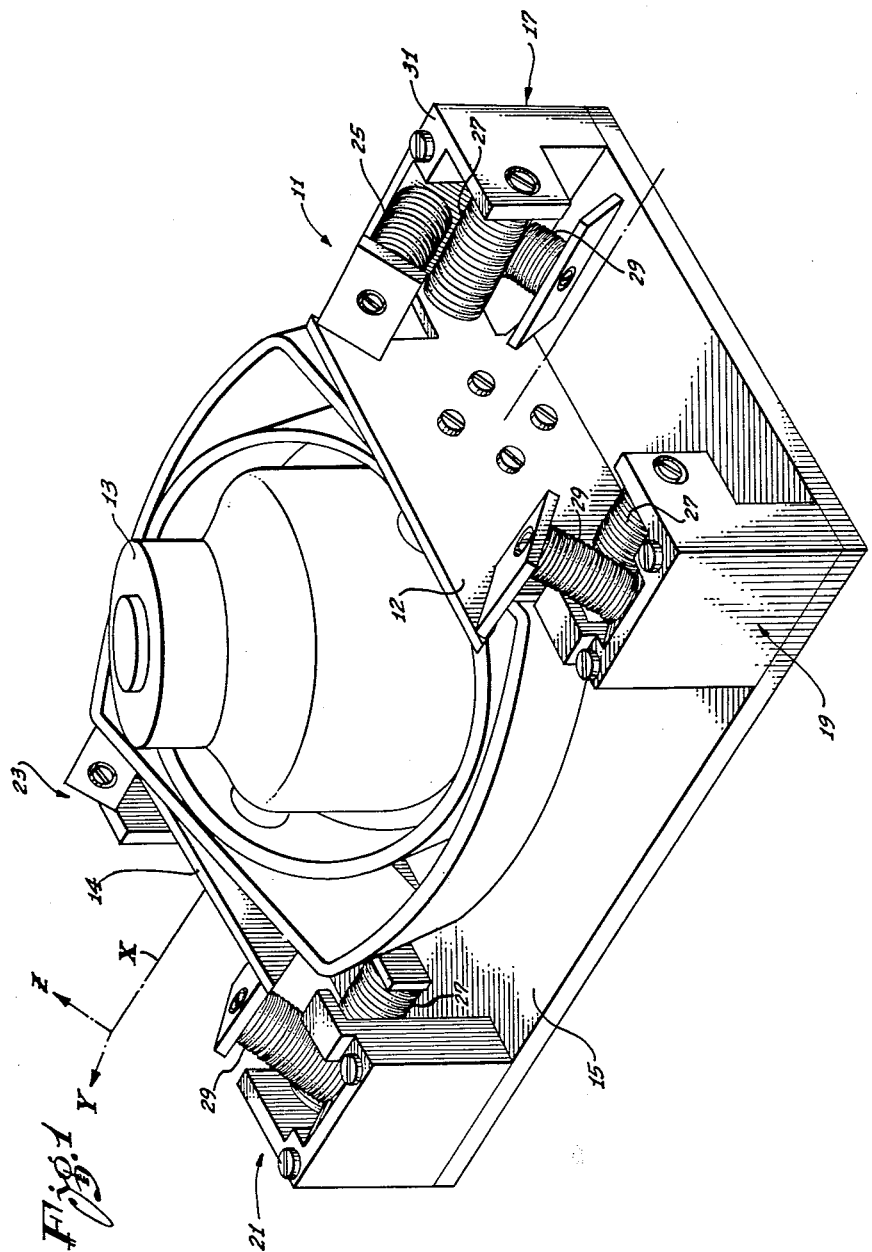
FIGURE 1 is a three-dimensional view of an irrotational mount of the invention with an inertial platform mounted thereon.

Referring now to the drawings wherein like or corresponding parts are designated by the same reference characters throughout the several views, there is shown in FIGURE 1 a three-dimensional view of an irrotational mount 11 of the invention operable to isolate platform 13 from vibrations experienced by a base 15 and to preserve the angular orientation of platform 13 relative to base 15. As is shown in FIGURE 1 mount 11 includes a pair of platform plates 12 and 14 connecting an inertial platform 13 to a base 15, platform plates 12 and 14 being supported off and connected to base 15 by a plurality of four support members 17, 19, 21 and 23.

As is shown in FIGURE 1, each of the plurality of four support members 17, 19, 21, and 23 includes a plurality of three mutually orthogonal cylindrical bellows-like units 25, 27, and 29. As is further indicated in FIGURE 1, each support member includes an orienting block 31 which is connected to base 15. Furthermore, one end of each of the bellows units 25, 27, and 29 is connected to orienting block 31 in such a fashion that the three bellows units are oriented mutually orthogonal each other, the other ends of each of the bellows units of supports 17 and 19 being connected to platform plate 12 while the other ends of bellows units of supports 21 and 23 are connected to platform plate 14 oppositely disposed from plate 12.

As is further shown in FIGURE 1, plates 12 and 14 are coupled to opposite ends of the outer gimbal ring of platform 13 whereby the platform is mounted to base 15 in such a manner that it is isolated from vibration experienced by base 15 and yet is maintained in a predetermined angular position with respect to base 15. It should be noted, as is well known to those skilled in the art, that through selective activation of the gimbal ring torquers, the central portion of the platform suspended by the gimbal rings can be selectively rotated in a predetermined manner relative to base 15. However, this predetermined predictable rotation which is experienced by only a portion of the platform and which is not experienced by the outer gimbal ring of the platform should be distinguished from the unpredictable rotation of the total platform relative to base 15 which but for the mount of the invention would be experienced by the platform whenever the base is subjected to external accelerations.

Figure 2:
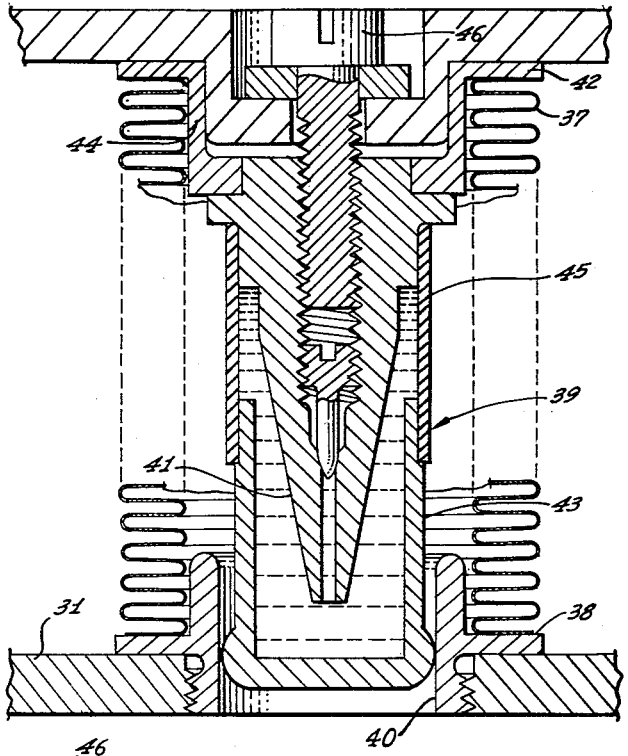
FIGURE 2 is a side sectional view of an unstressed bellows-like unit of the present invention illustrating the damping finger positioned therein.

Before discussing with particularity the overall operation of the mount of the invention, attention is directed to the structure and operation of the individual bellows-like units 25, 27, and 29. In this regard, attention is directed to FIGURE 2, wherein there is shown a cross-sectional side elevation view of a unit suitable for use as bellows-like units 25, 27, and 29. As shown in FIGURE 2, the unit includes a bellowed sleeve 37 fabricated from a rigid material of thin cross-section having one end attached to a circular flange 38 of a hollow mounting nut 40 which is threadably coupled to orienting block 31 while the other end of the bellowed sleeve is attached to a circular flange 42 of a washer 44 which is in turn connected to one of the platform plates. It should be noted that in choosing the rigid material from which the bellowed sleeve 37 is fabricated, it should be kept in mind that the thickness of the sleeve material should be chosen in light of the strength of the specific material used and in view of the weight of the platform to be supported and the number of bellows units to be used in supporting the platform so that the sleeve has sufficient rigidity to prevent the sleeve from being compressed sufficiently to allow the platform plates to come in contact with base 15. As is further shown in FIGURE 2, a flexible tank 39 is positioned within the bellowed sleeve and a damping finger 41 is positioned within the flexible tank. As is indicated in FIGURE 2, tank 39 includes a cylindrically shaped head 43 having a curved side surface which rides against the interior of nut 40 in such a manner that it can slide and rotate with respect to nut 40 and a flexible tube 45 which connects head 43 with the base portion of damping finger 41. As is further indicated in FIGURE 2, damping finger 41 is rigidly affixed to the platform plate by means of a bolt 46.

As is apparent from the foregoing, tank 39 as well as bellowed sleeve 37 is capable of being flexed. Accordingly, while tank 39 and bellowed sleeve 37 are, as shown in FIGURE 2, symmetrically oriented with respect to the longitudinal axis A—A of the bellows unit when the bellows unit is in its unflexed position, it is clear that bellowed sleeve 37 as well as tank 39 flex, as shown in FIGURE 3, to compensate for movement of orienting block 31 relative to the platform plates orthogonal to the axis of the unit.

Figure 3:
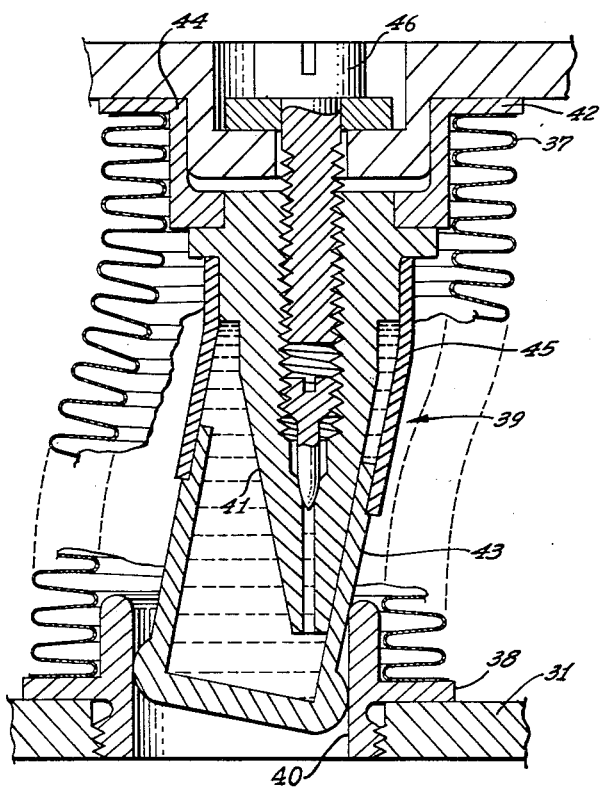
FIGURE 3 is a side sectional view of the bellows-like unit of FIGURE 2 in flexure.

As shown in FIGURE 3, flexible tube 45 permits tank 39 to follow the motion of block 31, head 43 sliding along the inner surface of hollow nut 40 to take up its new position with respect to the nut. It should be noted that damping finger 41 remains symmetrically oriented about the longitudinal axis of the bellows unit and thus acts as a flexure limit. Furthermore, by filling the interior of tank 39 with a damping fluid such as oil, damping finger 41 tends to damp or diminish the magnitude of each flexure so that the number of flexures as well as the magnitude thereof in response to vibratory motions of the base and orienting blocks can be substantially reduced.

Continuing with the discussion of the operation of the individual bellows units, it is clear that movement of orienting block 31 relative to the platform plate along the longitudinal axis of the bellows-like unit is compensated for by the bellows-like unit varying its length. More particularly, bellowed sleeve 37 contracts or expands to adjust for the movement while tank 39 is capable of accommodating for the change in length of sleeve 37 by head 43 sliding up and down along the inside surface of hollow nut 40. Hence, it is clear that each bellows-like unit is capable of isolating the platform plate from movement of the orienting block and base both along its axis and orthogonal thereto.

Referring now to another and most important feature or characteristic of the bellows-like unit, it should be noted that bellowed sleeve 37 resists rotation about its longitudinal axis. More particularly, it is almost impossible to rotate one end of the bellows-unit relative to its other end. This feature, coupled with the foregoing described isolating features of the bellows-like unit, permits the mechanization of the irrotational isolation mount of the present invention.

Referring now to the overall operation of the irrotational mount of the present invention, attention is again directed to FIGURE 1. As shown in FIGURE 1, there is superimposed over the figure an X–Y–Z coordinate system with the X axis oriented parallel with the longitudinal axes of bellows-like units 27 of the four support members, the Y axis oriented parallel with the longitudinal axes of the bellows-like units 25 of the support members, and the Z axis oriented parallel with the longitudinal axes of the bellows-like units 29 of the support members.

Considering now the operation of the mount in response to vibration directed along the X axis, it is clear that the four bellows-like units 27 of the support members will expand and contract in accordance with the displacement of base 15 relative to platform 13 whereby the platform is isolated from the movement of base 15. In a like manner, bellows-like elements 25 are operable to isolate platform 13 from displacement of base 15 directed along the Y axis while bellows-like elements 29 isolate the platform from displacement of base 15 directed along the Z axis. Accordingly, by the concurrent operation of bellows-like units 25, 27, and 29 of the four support members, the platform is isolated from displacements of base 15 regardless of the orientation of the displacement.

Remembering that bellows-like units 25, 27, and 29 resist rotation about their longitudinal axes, it is clear that bellows-like units 25 resist rotation of platform 13 about the Y axis while bellows-like units 29 resist rotation of platform 13 about the Z axis. Furthermore, bellows-like units 27 prevent rotation of platform 13 about the X axis so that concurrent operation of bellows-like units 25, 27, and 29 prevent rotation of platform 13 relative to base 15.

Therefore, platform 13 is irrotationally mounted with respect to base 15.

It is to be expressly understood, of course, that numerous other modifications and alterations may be made in the irrotational mount of the present invention. For example, while the mount is shown in FIGURE 1 as having four support members, it is clear that the mount could be mechanized with three or two support members by properly shaping the platform. Accordingly, it is to be expressly understood that the scope of the invention is to be limited only by the spirit and scope of the appended claims.

What is claimed as new is:

1. An irrotational mount positioned on a base plate for isolating an inertial unit compled to the mount from vibration experienced by the base plate, said mount comprising: a mounting structure having the inertial unit mounted thereto; a plurality of four support members, each including a plurality of three substantially mutually orthogonal irrotational bellows; and coupling means for connecting one of the ends of each of said bellows to said mounting structure and the other of the ends of said bellows to the base plate, each of said bellows having damping means associated therewith for damping movement of said bellows.

2. In an irrotational isolation mount; the combination comprising: a base member; a platform mountable upon said base member; first, second, and third bellows, each of said bellows being compressible along and irrotational about its longitudinal axis; mounting apparatus having said platform mounted therein; coupling means for connecting one end of each of said bellows to said mounting apparatus and the other end of each of said bellows to said base member with the axis of said bellows being oriented substantially orthogonal each other whereby said mounting apparatus is isolated from vibratory movements of said base and is incapable of experiencing rotation relative to said base; and first, second, and third damping means associated with said first, second and third bellows, respectively, for damping movement of said bellows.

3. In an irrotational mount, the combination comprising: a first member; a second member; a bellowed sleeve having one end connected to said first member and the other end connected to said second member; a flexible tank positioned within said bellowed sleeve and coupled to said first member, said flexible tank including a damping finger therein connected to said first member, the motion of said first member relative to said second member being compensated for by the flexure of said bellowed sleeve and said flexible tank; and a damping liquid positioned within said flexible tank cooperating with said damping finger to damp the motion of said bellowed sleeve.

4. In an irrotational isolation mount, the combination comprising:
a base member;
a platform;
a mounting structure including a plurality of mounting means for supporting said platform upon said base member, said mounting structure preventing rotation of said platform relative to said base member about three orthogonal axes and isolating said platform from vibrations experienced by said member, each of said mounting means having first, second, and third bellows positioned substantially orthogonal each other, each oriented along a different one of said three orthogonal axes, each of said bellows units being irrotational about its longitudinal axis and being expandable and compressible about its longitudinal axis; and
damping means associated with each bellows unit to dampen movements thereof.

5. The combination defined in claim 4, wherein each of said bellows units includes:
a first member;
a second member;
a bellowed sleeve having one end connected to said first member and the other end connected to said second member;
a flexible tank positioned within said bellowed sleeve and coupled to said first member, said damping means including a damping finger positioned in said tank and connected to said first member, the motion of said first member relative to said second member being compensated for by the flexure of said bellowed sleeve and said flexible tank; and
a damping liquid positioned within said flexible tank cooperating with said damping finger to damp the motion of said bellowed sleeve.

6. In an irrotational isolation mount, the combination comprising:
a base member;
a platform;
a damping fluid;
a mounting structure including a plurality of mounting means for supporting said platform upon said base member, said mounting structure preventing rotation of said platform relative to said base member about three orthogonal axes and isolating said platform from vibrations experienced by said member, each of said mounting means having first, second, and third bellows units filled with said damping fluid to dampen movement of said bellows unit positioned substantially orthogonal to each other and each oriented along a different one of said three orthogonal axes, each of said bellows units being irrotational about its longitudinal axis and being expandable and compressible along its longitudinal axis; and
additional damping means associated with each bellows unit to dampen movements thereof.

References Cited in the file of this patent

UNITED STATES PATENTS

| | | |
|---|---|---|
| 804,884 | Rutan | Nov. 21, 1905 |
| 1,540,355 | Mathes | June 2, 1925 |
| 1,994,885 | De Florez | Mar. 19, 1935 |
| 2,876,979 | Barbera | Mar. 10, 1959 |
| 2,903,228 | Neher | Sept. 8, 1959 |
| 2,912,212 | Lowe et al. | Nov. 10, 1959 |
| 2,919,883 | Murphy | Jan. 5, 1960 |

FOREIGN PATENTS

| | | |
|---|---|---|
| 588,137 | Great Britain | May 15, 1947 |